United States Patent

Nicholas et al.

[15] 3,668,034
[45] June 6, 1972

[54] METHOD FOR MAKING A DECORATIVE PLASTIC LAMINATE

[72] Inventors: Arthur S. Nicholas; Sarkis M. Kassouni, both of Grand Rapids, Mich.

[73] Assignee: U. S. Industries, Inc.

[22] Filed: Aug. 5, 1970

[21] Appl. No.: 61,215

Related U.S. Application Data

[62] Division of Ser. No. 716,140, Mar. 26, 1968.

[52] U.S. Cl..............................156/245, 156/242, 156/306, 156/309
[51] Int. Cl.......................................................B29c 19/00
[58] Field of Search ..........................156/242, 245, 306, 309

[56] References Cited

UNITED STATES PATENTS 3,522,126  7/1970  Ptak...................................156/245 X
3,562,051  2/1971  Strauss...............................156/245 X

*Primary Examiner*—Benjamin R. Padgett
*Assistant Examiner*—Stephen J. Lechert, Jr.
*Attorney*—Price, Heneveld, Huizenga & Cooper

[57] ABSTRACT

This disclosure relates to plastic laminates, preferably in the nature of an article, having an outer metalized layer, an intermediate bonding layer of a relatively low melting point, and a backing layer formed of a synthetic thermoplastic material whose melting point is at least as high and preferably higher than the melting point of the intermediate layer. The laminate is formed by bonding the outer metalized layer to the intermediate layer, preferably by heat fusion, placing the laminate of the metalized layer and the intermediate layer into a mold and injecting the backing material into the mold to form an article and to bond the backing material to the intermediate layer.

11 Claims, 3 Drawing Figures

INVENTORS
ARTHUR S. NICHOLAS
SARKIS M. KASSOUNI

BY Price, Heneveld, Huizenga & Cooper
ATTORNEY

METHOD FOR MAKING A DECORATIVE PLASTIC LAMINATE

This is a divisional application of parent application, Ser. No. 716,140, filed March 26, 1968, and entitled PLASTIC LAMINATE AND METHOD FOR MAKING SAME.

This invention relates to a process for making a plastic laminate having an outer decorative layer and a backing layer of synthetic heat softenable organic material, the process steps comprising laminating onto the outer layer a heat softenable adhesive layer which has a melting point at least as low as the melting point of the thicker layer of the organic material, and heat sealable with the organic material, placing the laminate of the decorative layer and the adhesive layer into a mold cavity with the outer surface of the decorative layer against the mold, and forcing the synthetic organic material into the mold at a temperature and pressure sufficient to flow the synthetic organic material into the extremities of the mold cavity to thereby bond the synthetic organic material to the adhesive layer.

In another of its aspects, the invention relates to a process for making an article having a decorative metalized film on at least a portion of the surface comprising the steps of laminating a thin film of a lower temperature synthetic thermoplastic material onto the metalized film, placing the laminated thermoplastic film into a mold cavity with the outer surface of the metalized film against the side of the mold cavity, and injecting into the mold cavity at a high temperature and pressure, a flowable synthetic thermoplastic material having a melting point at least as high as the lower temperature synthetic thermoplastic material.

In still another aspect, the invention relates to a plastic laminate having a decorative layer of a metalized material, an intermediate layer of a synthetic thermoplastic material having a melting point substantially lower than that of the decorative layer, and a backing layer of a relatively soft synthetic thermoplastic material having a melting point slightly greater than the melting point of the intermediate layer, the intermediate layer being bonded to the decorative layer and the backing layer.

Metalized polyester films resembling metallic chrome and aluminum have recently been used for trim parts in automobile interiors. Recently, the metalized film has been used on padded vinyl parts. Heretofore, the polyester metalized film has been attached to the vinyl by an adhesive layer between the polyester film and the vinyl, or by heat sealing the polyester film to the backing. The adhesion by these methods is sufficient but, both methods require a separate operation to attach the polyester film to the vinyl backing material. Further, in the heat sealing operation, it is sometimes difficult to properly position the polyester film on the vinyl backing part.

We have now discovered that the metalized polyester film can be integrally bonded to the vinyl part during the forming operation for the vinyl part by employing an intermediate film on the polyester metalized film having a melting point equal to or less than that of the vinyl part. The metalized film can then be bonded through the intermediate layer to the backing part by an injection molding process.

By various aspects of this invention one or more of the following, or other, objects can be obtained.

It is an object of this invention to provide an article having a metalized surface.

It is a further object of this invention to provide a laminate having a decorative surface.

It is a further object of this invention to provide an article having a decorative metalized outer layer wherein the decorative layer is integrally bonded to the article as the article is formed.

It is a further object of this invention to provide a simplified process for producing a vinyl article having decorative metalized trim on portions of an outer surface.

Other aspects, objects, and the several advantages of this invention are apparent to one skilled in the art from a study of this disclosure, the drawings, and the appended claims.

According to the invention, there is provided a plastic laminate having a first decorative layer, preferably of a metalized material, bonded to an intermediate layer of a lower temperature melting point synthetic thermoplastic material, and a backing layer of a synthetic thermoplastic material having a melting point slightly greater than the melting point of the intermediate layer and being intergrally bonded to the intermediate layer. Preferably, the backing layer is a relatively soft material.

Further according to the invention, there is provided a process for producing an article such as a metalized trim part, comprising the steps of laminating a decorative film with a thermoplastic adhesive layer, positioning the metalized laminate in a mold wherein the outer surface of the decorative film is positioned against the mold surface, injecting a flowable thermoplastic material into the mold at a high temperature and pressure sufficient to fuse said thermoplastic adhesive layer to said synthetic material and to form said article, the synthetic material injected into the mold having a melting point at least as high as the melting point of the thermoplastic adhesive layer.

Preferably, an article having a metalized insert, is made from the process according to the invention.

The decorative or metalized layer can be any film forming material which has a decorative appearance and can be bonded to an intermediate thermoplastic film which will be hereinafter described. Examples of the metalized film are aluminum, and polyester films such as those formed by the condensation reaction of ethylene glycol with terephthalic acid. The preferred metalized film is a polyester having a melting point in the range of 480° to 510° F. Such a material is commercially available and is sold under the trademark "MYLAR". The thickness of the decorative layer can vary depending on the type of material and the described effect of the decorative layer. As an example, the thickness of a metalized polyester fiber can be 1 mil (1/1,000 inch) or less.

The intermediate bonding layer can be any thermoplastic material which is bondable to the metalized layer and to the backing layer, the latter bonding taking place during the molding process. Preferably, the intermediate bonding layer is a thermoplastic film having a melting point equal to or less than the melting point of the backing layer so that the bonding layer is fused to the backing layer during the molding process. Generally the melting point of the intermediate layer will be in the range of 10° to 50° F. below the melting point of the thermoplastic backing layer, preferably in the range of 15° to 30° F. below the melting point of the backing layer. Thus, the composition of the bonding layer will depend somewhat on the composition of the backing material. Suitable intermediate layers include vinyl polymers and copolymers such as vinyl butyral polymers, vinyl chloride polymers, vinyl chloride-acetate polymers, vinylidene chloride polymers, vinyl formal molding compounds, polyvinyl dichloride compounds, and soft flexible polystryene compounds such as acrylonitrile butadiene stryene terpolymers and blends.

The thickness of the intermediate backing layer can vary depending on the type of material. For a polyvinyl chloride material, the thickness of the intermediate layer could be in the range of 2 to 20 mils.

The backing layer which is injected into the mold at a high temperature and pressure can be any suitable synthetic moldable thermoplastic material, preferably one which is injection moldable. Suitable compositions for the backing layer include vinyl polymers and copolymers such as enumerated above and acrylonitrile-butadiene-stryene terpolymers and blends.

In a preferred embodiment of the invention, the intermediate bonding layer comprises a vinyl polymer and the backing material comprises a vinyl polymer.

The molding temperature will vary depending on the material used. Generally, the molding temperature will be between 250° and 500° F. The molding pressure will also vary with the type of material. The injection molding pressures will generally be in the range of 6,000 to 30,000 p.s.i.

The laminate can be formed by bonding a sheet of the intermediate layer to a sheet of the decorative metalized layer using well known heat bonding and fusing methods. The trim parts can then be cut out from the composite sheets and placed into an injection mold. The backing layer can then be injected into the mold under sufficient heat and pressure to cause the thermoplastic polymer to flow into the mold cavity forming the article, and to fuse the intermediate layer to the backing layer.

The invention will now be described with reference to the accompanying drawings in which.

Figure 1:
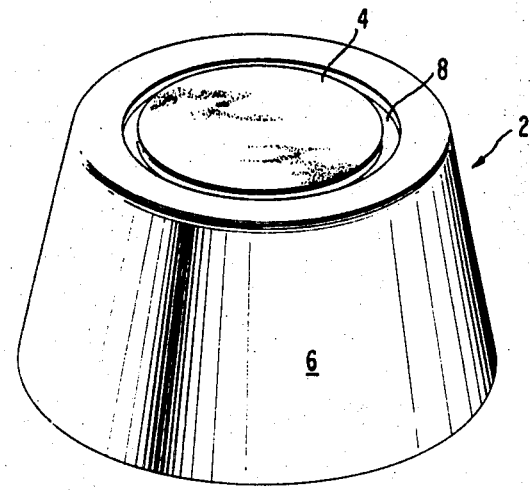
FIG. 1 is a perspective view of an article embodying the invention.
Figure 2:
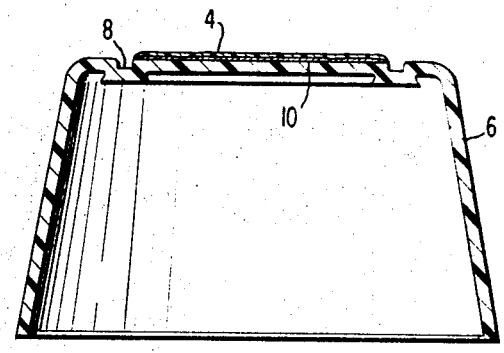
FIG. 2 is a cross sectional view of the article shown in FIG. 1.

Referring now to the drawings, which will be used to describe a specific example of the invention, a shell-like article 2 is frustroconically shaped and has a metalized polyester film integrally bonded thereto. For decorative purposes, the polyester film is surrounded by an indentation 8. The article comprises a soft vinyl body 6 which is bonded to the polyester film 4 through a bonding layer 10.

The soft vinyl body is a soft injection moldable material such as made from polymers of vinyl chloride and vinylidene chloride. The polyester film is one which gives a decorative effect preferably of material such as metalized Mylar, such as sold by the Dorrie Process Co.

The intermediate bonding layer 10 is one which can be easily bonded to the soft vinyl body during the injection molding process. Thus, the bonding layer will have properties such as to be fusable with the vinyl body at the injection molding temperatures and can be made out of the same materials as the soft vinyl body having a melting point equal to or less than the vinyl body.

Figure 3:
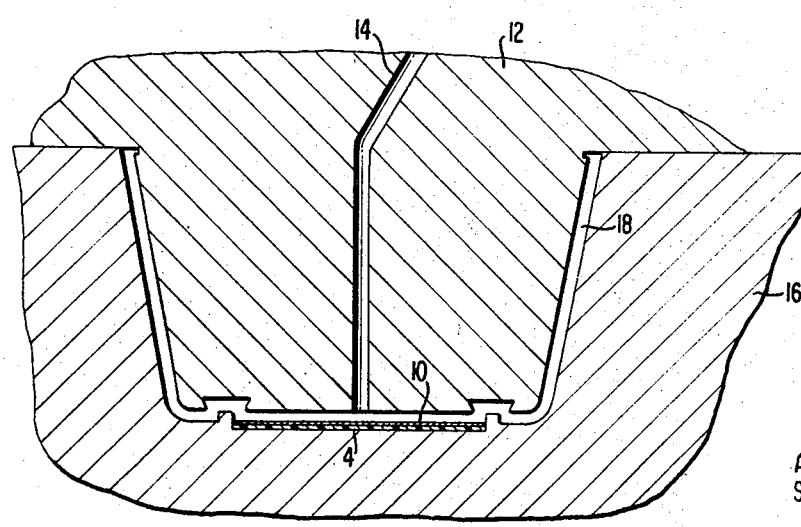
FIG. 3 is a schematic representation showing the method of making the article of FIGS. 1 and 2.

The polyester film and the intermediate bonding layer 10 are bonded together through conventional procedures such as heat sealing. The polyester film is then cut out to the desired configuration and placed in a mold cavity such as illustrated in FIG. 3.

The mold cavity 18 is formed from a female die member 16, a male mandrel member 12 having an injection port 14. The female die member has a slight indentation for positioning the polyester film and the bonding layer.

After the polyester film and intermediate bonding layer laminate has been placed in the mold with the polyester film downwardly adjacent the mold cavity wall, the male mandrel member is closed into the female member 16. Flowable soft vinyl material is injected through injection port 14 under high pressure as is conventional with injection molding. The high temperature of the injection molding material and the high pressure involved causes a fusing between the bonding layer 10 and the soft vinyl material. An article such as shown in FIG. 1 results.

By the process of the invention, the polyester film can be caused to have a decorative surface. The polyester film will take on the characteristics of the mold. Thus, a smooth polyester film can be placed into a mold having a grainy surface. The resulting article will contain a polyester film having a rough or grainy surface. Other kinds of decorative surfaces can also be developed according to the invention.

With the use of the invention, the desired article is produced simply and efficiently. The positioning of the Mylar film in the article is also quite precise since the mold contains the proper cavity for this purpose. Essentially, the article is produced in a one step operation without the need for costly heat sealing and gluing operations.

As used throughout this specification, the term melting point is intended to signify that temperature or range of temperatures at which a composition will soften sufficiently to flow under its own weight. For example, the melting point of Mylar polyester film is in the range of 480° to 510° F.

As used throughout this specification, the term thermoplastic is intended to signify a material or mixture of materials which has components that soften upon heating.

Reasonable variation and modification are possible within the scope of the foregoing disclosure, the drawings, and the appended claims of the invention without departing from the spirit thereof.

The embodiments of the invention in which an exclusive property or privilege is claimed are defined as follows.

1. A process for making a plastic laminate having a first decorative layer and a second layer of synthetic thermoplastic material having a melting point lower than the melting point of said first decorative layer, comprising the steps of:

laminating on a first surface of said first decorative layer a thermoplastic adhesive intermediate layer which has a melting point at least as low as the melting point of said synthetic thermoplastic material of said second layer, said thermoplastic adhesive layer being heat sealable with said synthetic thermoplastic material of said second layer;

placing said adhesive laminated decorative layer into a mold cavity with the surface opposite said adhesive laminated first surface of said decorative layer positioned against a mold cavity wall and with said adhesive laminated first surface exposed to the interior of the mold cavity; and forcing the synthetic thermoplastic material of said second layer into said cavity at a temperature and pressure sufficient to make said synthetic thermoplastic material of said second layer flowable into said mold and to form a fusion bond between said thermoplastic adhesive layer and said synthetic thermoplastic second layer, but at a temperature approximately equal to or less than the melting point of the first decorative layer.

2. A process for making an article having a decorative metalized film on at least a portion of the surface comprising: laminating a thin film of a synthetic heat softenable organic material onto a first surface of said metalized film; placing at least a portion of said laminated film into a mold cavity with the opposite said laminated first surface against a side of the mold cavity and with said laminated first surface exposed to the interior of said mold cavity; and injecting into said mold cavity at a high temperature and pressure, a flowable synthetic organic material having a melting point at least as high as the melting point of said synthetic heat softenable organic film which is laminated to said metalized film.

3. A process according to claim 2 wherein said mold cavity has a grainy surface and a grainy surface is formed on said metalized film during the molding process.

4. A process according to claim 3 wherein said metalized layer is a high temperature thermoplastic material having a melting point above the melting point of said synthetic heat softenable organic film laminated to said metalized film and above the melting point of the flowable synthetic organic material injected into said mold cavity.

5. A process according to claim 4 wherein said high temperature metalized film is a polyester film having a melting point in the range of 480° to 510° F.

6. A process according to claim 5 wherein said synthetic heat softenable organic film bonded to said metalized film has a melting point in the range of 10° to 50° F. below said melting point of said flowable synthetic organic material injected into said mold cavity.

7. A process according to claim 6 wherein said synthetic heat softenable organic film bonded to said metalized film is a polymer of vinyl chloride.

8. A process according to claim 7 wherein said flowable synthetic organic material injected into said mold cavity is selected from the group consisting of vinyl polymers and copolymers thereof.

9. A process according to claim 7 wherein said flowable synthetic organic material injected into said mold cavity is a material selected from the group consisting of acrylonitrile-butadiene-stryene terpolymers and blends thereof.

10. A process according to claim 2 wherein said flowable synthetic organic material injected into said mold cavity is a material selected from the group consisting of vinyl polymers and copolymers thereof.

11. A process according to claim 2 wherein said flowable synthetic organic material injected into said mold cavity is a material selected from the group consisting of acrylonitrile-butadiene-stryene terpolymers and blends thereof.

* * * * *